Patented June 4, 1940

2,203,227

UNITED STATES PATENT OFFICE 2,203,227

ANTHRAQUINONE VAT DYESTUFFS

Ralph N. Lulek, Silverside Heights, Del., and William Dettwyler, Pitman, N. J., assignors to E. I. du Pont de Nemours & Company, Wilmington, Del., a corporation of Delaware No Drawing. Application August 16, 1939, Serial No. 290,430

4 Claims. (Cl. 260—316)

This invention relates to the preparation of anthraquinone vat dyestuffs and more particularly to the preparation of new trianthrimide-mono-carbazole dyestuffs of the general formula:

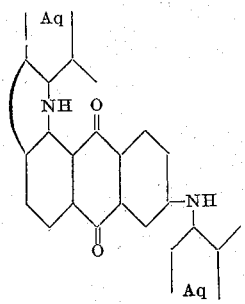

wherein the Aq's stand for radicals of the anthraquinone series.

The object of the invention is to prepare new and valuable vat dyestuffs of the trianthrimide-mono-carbazole series which dye in desirable shades in the brown-range and which exhibit good fastness and dyeing properties.

We have found that where compounds of the anthraquinone series are produced which carry both the anthrimide-carbazole grouping and an alpha-beta-anthrimide linkage in the 6-position of the anthrimide-carbazole nucleus, they are valuable dyestuffs dyeing cotton from the usual alkaline hydrosulfite vat in brown shades which exhibit superior fastness properties over those in which the second anthrimide linkage is ring-closed to carbazole.

According to the present invention, 1,6-dichloroanthraquinone is condensed with one mole of an alpha-aminoanthraquinone compound, which may carry other substituents, and then ring-close to the dianthrimide carbazole. The resulting product is then condensed with a second alpha-aminoanthraquinone compound which may or may not be the same as the one originally employed, to give an alpha-beta-anthrimide linkage on the anthrimide carbazole nucleus. Alternatively, the same compound may be prepared by condensing 1-amino-6-chloro-anthraquinone with an alpha-chloroanthraquinone compound and then after ring-closing to the carbazole compound condensing the resulting 6-chlorodianthrimide carbazole with an alpha-aminoanthraquinone compound.

These new dyestuffs may also be produced by condensing one mole of 1,6-dichloroanthraquinone with two moles of an aminoanthraquinone and then subjecting the resulting 1',1,6,1''-trianthrimide to a mild ring-closing procedure which will effect carbazolation of only the alpha-anthrimide linkage.

The condensations of the aminoanthraquinone with the chloroanthraquinone and the ring-closure of the anthrimide compounds to the carbazole may be carried out by the methods usually employed in the prior art for the preparation of anthrimides and anthrimide carbazole compounds with the exception that where the di-condensation is carried out prior to the ring-closure of the alpha-alpha-anthrimide the ring-closure of the alpha-alpha-anthrimide to the carbazole must be carried out under sufficiently mild condition that no carbazolation of the alpha-beta-anthrimide occurs.

The following examples are given to illustrate the invention. The parts used are by weight.

Example 1

Twenty-eight parts of 1:6-dichloroanthraquinone are condensed with 23 parts of 1-aminoanthraquinone in 400 parts nitrobenzene in presence of 10 parts of soda ash and 2 parts of cuprous chloride at reflux temperature. After cooling, the anthrimide is isolated by filtering, washing with nitrobenzene, alcohol, dilute hydrochloric acid and water in turns, and drying the resulting filter cake.

Thirty parts of this anthrimide are converted to the carbazole by fusion in 150 parts of a 9 to 1 aluminum chloride-sodium chloride mixture at 160–170° C. The product is isolated by filtering, washing with water and drying. It has the probable formula:

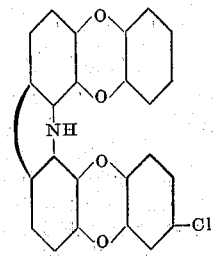

Example 2

Ten parts of the above carbazole are condensed with 5 parts of 1-aminoanthraquinone in 200 parts of nitrobenzene, 3 parts of soda ash and 1 part of cuprous chloride at reflux temperature for 12 hours. The mass is drowned in water, steam distilled to remove the nitrobenzene and then filtered off, washed with dilute hydrochloric acid, then with water and dried. The isolated product is a dark powder, soluble in concentrated sulfuric acid with an olive-black color and dyes cotton from an alkaline hydrosulfite vat in red-brown shades. When the condensation is made with 1-amino-5-benzoylaminoanthraquinone, a vat dyestuff is obtained which dies in violet-brown shades.

Example 3

Thirty-four parts of 1-amino-5-benzoylaminoanthraquinone, 28 parts of 1:6-dichloroanthraquinone, 10 parts of soda ash and 1 part of cuprous chloride are heated at reflux temperature in 400 parts of nitrobenzene for 8 hours. After cooling the mass to room temperature 200 parts of ground aluminum chloride are added. The mass is then heated to 65° C. and held for ½ hour at this temperature, then poured into 1000 parts of ice and water under agitation. After stirring for 2 hours, the nitrobenzene is removed with steam. The resulting compound is isolated by filtering, washing the filter cake with dilute hydrochloric acid, and drying. It is a dark powder, soluble in concentrated sulfuric acid with a blue color.

Twenty parts of the anthrimide-carbazole thus obtained are condensed in 400 parts of nitrobenzene with 12 parts of 1-amino-5-benzoylaminoanthraquinone, 5 parts of soda ash and 1 part of cuprous chloride by refluxing the mixture for 16 hours. After cooling to room temperature the condensation product is filtered off and washed with nitrobenzene, then with alcohol, dilute hydrochloric acid, and water in turns and dried. It is a dark powder, soluble in concentrated sulfuric acid with a blue color and dyes cotton from an alkaline hydrosulfite vat in yellow brown shades. It has the following probable formula:

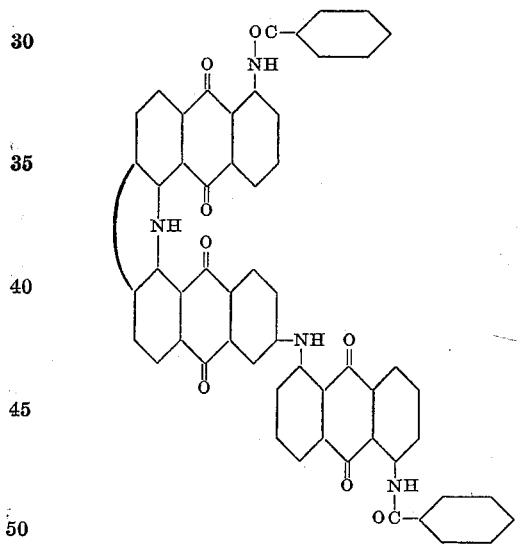

When 1-amino-4-benzoylaminoanthraquinone is condensed with the anthrimide-carbazole of Example 3, a brown dyestuff is obtained.

5 - amino - 2:1(N) - anthraquinone - benzacridone as the second component gives a violet-brown dyestuff.

4-amino-1(N)-methyl-anthrapyridone gives a brown-orange dyestuff.

*Example 4*

Thirty-four parts of 1-amino-4-benzoylaminoanthraquinone are condensed in 400 parts of nitrobenzene with 28 parts of 1:6-dichloroanthraquinone in the presence of 10 parts of soda ash and 1 part of cuprous chloride at reflux temperature for 8 hours. After cooling to room temperature, 200 parts of ground aluminum chloride are added and the temperature is raised to 65° C. and held for ½ hour. The mass is poured into 1000 parts of ice and water under agitation, stirred for 2 hours and steam distilled, filtered, washed with dilute hydrochloric acid then with water and dried. The resulting chloro-benzoylaminoanthrimide-carbazole is a dark powder, soluble in concentrated sulfuric acid with a red color.

Twenty parts of the above chloro-benzoylaminoanthrimide-carbazole, 12 parts of 1-amino-5-benzoylaminoanthraquinone, 5 parts of soda ash, and 1 part of cuprous-chloride are refluxed in 400 parts of nitrobenzene for 16 hours. After cooling to room temperature the trianthrimide-monocarbazole is isolated as in Example 3. It is a dark powder, soluble in concentrated sulfuric acid with a red-brown color and dyes cotton from an alkaline hydrosulfite vat in red-brown shades. It has the probable formula:

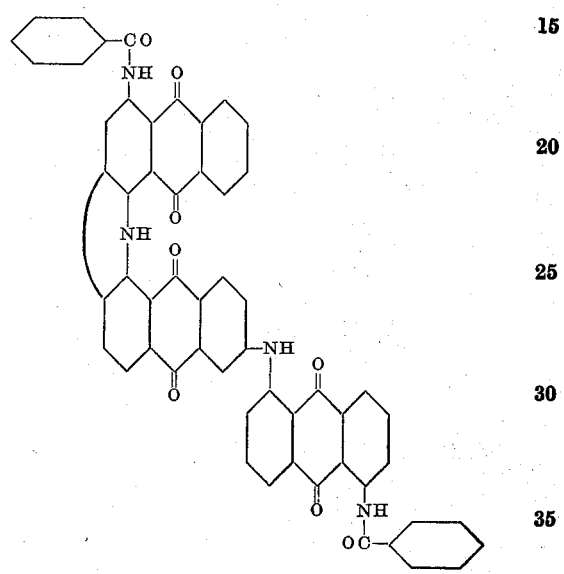

When 1-amino-4-benzoylaminoanthraquinone is used as the second component a dye is obtained which dissolves in concentrated sulfuric acid with a red-brown color and dyes cotton from a vat in violet-brown shades.

When the condensation is made with 5-amino-2:1(N)-anthraquinone-benzacridone a brown-violet dye is obtained.

With 4-amino-1(N)-methylanthrapyridone as the second component a brown-red dyestuff is produced.

*Example 5*

Five hundred parts of nitrobenzene, 34 parts of 5 - amino- 2:1(N) - anthraquinone-benzacridone, 28 parts of 1:6-dichloroanthraquinone, 10 parts of soda ash and 1 part of cuprous chloride are heated at 200°–205° for 8 hours. After cooling to 40° C., 200 parts of aluminum chloride (ground) are added and the mass is heated to 135° C. and held for 3 hours at 135–137° C. The mass is then poured into 1000 parts of cold water and steam distilled. The product is filtered off, washed with dilute hydrochloric acid, and then with water and dried. The resulting anthrimide-carbazole is a dark powder, soluble in concentrated sulfuric acid with a red-brown color.

Ten parts of this anthrimide-carbazole are condensed with 6 parts of 1-amino-5-benzoylaminoanthraquinone in 250 parts of nitrobenzene, 3 parts of soda ash and 1 part of cuprous chloride at reflux temperature for 12 hours. The product isolated as in Example 1 is a dark powder, soluble in concentrated sulfuric acid and with a dark brown color and dyes cotton from the vat in brown shades. When the second condensation is carried out with 1-amino-4-benzoylaminoanthraquinone, a violet-brown dyestuff is obtained.

The condensation product of 8-amino-2:1(N)-anthraquinone-benzacridone with 1:6-dichloroanthraquinone, ring-closure to the carbazole and further condensation with either 1-amino-4-benzoylaminoanthraquinone or 1-amino-5-benzoylaminoanthraquinone gives similar shades to those of the products of Example 5.

Example 6

14 parts of 1:6-dichloroanthraquinone, 17 parts of 1-amino-5-benzoylaminoanthraquinone, 5 parts of soda ash, and 1 part of cuprous chloride are heated in 600 parts of nitrobenzene at 200–205° for 8 hours. 17 parts of 1-amino-4-benzoylaminoanthraquinone and 5 parts soda ash are then added and the heating continued for 12 more hours. After cooling to room temperature, the trianthrimide is isolated by filtering, washing with nitrobenzene, alcohol, dilute hydrochloric acid in turns and drying.

It is a dark red powder, soluble in concentrated sulfuric acid with a green color.

Forty-three parts of the above trianthrimide are dissolved in a mixture of 500 parts of nitrobenzene and 140 parts of aluminum chloride and the solution heated to 90° C. for one hour. The mass is then poured into 1000 parts of ice and water under agitation, stirred for one hour and steam distilled free of nitrobenzene. The product is filtered off and dried. The dyestuff is a dark powder, soluble in concentrated sulfuric acid with a blue color and dyes cotton in brown shades similar to the product of Example 2. When 1-aminoanthraquinone is used as the second component a dull red dyestuff is obtained. When 1-amino-4-benzoylaminoanthraquinone is used as the first component and 1-amino-5-benzoylaminoanthraquinone as the second component, a brown dyestuff is obtained which dyes in a similar shade to the product of Example 4.

Example 7

Seventeen parts of 1-amino-4-benzoylaminoanthraquinone, 5 parts of soda ash, 14 parts of 1:6-dichloroanthraquinone, and 1 part of cuprous chloride are heated in 600 parts of nitrobenzene at 200–205° C. for 8 hours, then 17 parts of 4-amino-2:1(N)-anthraquinone-benzacridone and 5 parts of soda ash are added and the heating continued for 16 hours. The anthrimide is isolated from the cooled mass as in the above examples. When dry it is a dark powder, soluble in concentrated sulfuric acid with an olive green color.

150 parts of ground aluminum chloride are dissolved in 500 parts of nitrobenzene and to the cooled solution are added 47 parts of the above trianthrimide. The mass is then heated to 65–70° C. and held at this temperature for ½ hour, poured into 1000 parts of ice and water and stirred for 1 hour. The nitrobenzene is then removed by steam distillation. The resulting compound when dry is a dark powder, soluble in concentrated sulfuric acid with a red color. It dyes cotton from a vat in brown shades.

When 5-amino-2:1(N)-anthraquinone benzacridone is used as second component a violet-brown dyestuff is obtained.

When 4-amino-1(N)-methyl-anthrapyridone is used as second component a dye is obtained of a similar shade to the product of Example 4.

When 1-aminoanthraquinone is the second component a violet-brown dyestuff is obtained.

Example 8

Fourteen parts of 1:6-dichloroanthraquinone, 34 parts of 1-amino-5-benzoylaminoanthraquinone, 10 parts of soda ash, and 1 part of cuprous chloride are condensed in 700 parts of nitrobenzene in the usual manner. Thirty-five parts of the so obtained trianthrimide are dissolved in a mixture of 500 parts of nitrobenzene and 110 parts of aluminum chloride at room temperature. The mass is then heated to 50° C. and maintained at this temperature for 1 and ½ hours. It is then poured into ice and water under agitation. The nitrobenzene is steam distilled off and the resulting mass filtered, washed with dilute hydrochloric acid, then rinsed with water and dried. The resulting product is a dark powder soluble in concentrated sulfuric acid with a blue color and dyes cotton from a vat in strong brown shades.

When the condensation is carried out with 2 moles of 1-amino-4-benzoylaminoanthraquinone a dye is obtained which dyes in dark brown shades.

When 2 moles of 8-amino-2:1(N)-anthraquinone-benzacridone are used, a chocolate brown dyestuff is then obtained.

As illustrated in the above examples, the end anthraquinone nucleii may be unsubstituted or they may carry substituents such as aryl-amino groups or they may carry additional ring-substituents such as illustrated by the anthraquinone-benzacridones and N-methyl-anthrapyridone radicals.

We claim:
1. Compounds of the following general formula

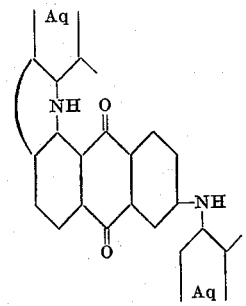

wherein the Aq's stand for radicals of the anthraquinone series.

2. The trianthrimide-monocarbazole of the formula

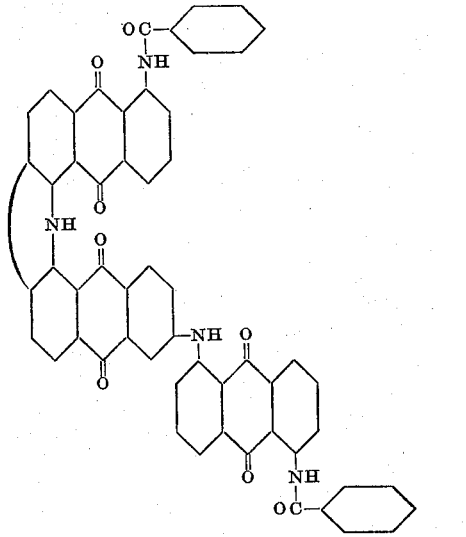

which dissolves in concentrated sulfuric acid with a blue color and dyes cotton from an alkaline hydrosulfite vat in yellow brown shades.

3. The trianthrimide-monocarbazole of the formula

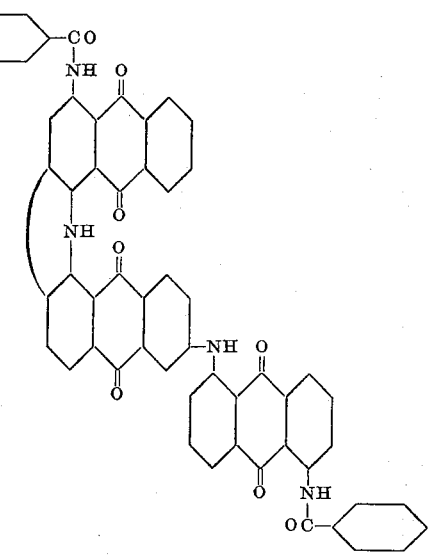

which dissolves in concentrated sulfuric acid with a red brown color and dyes cotton from an alkaline hydrosulfite vat in red brown shades.

4. The trianthrimide-monocarbazole of the formula

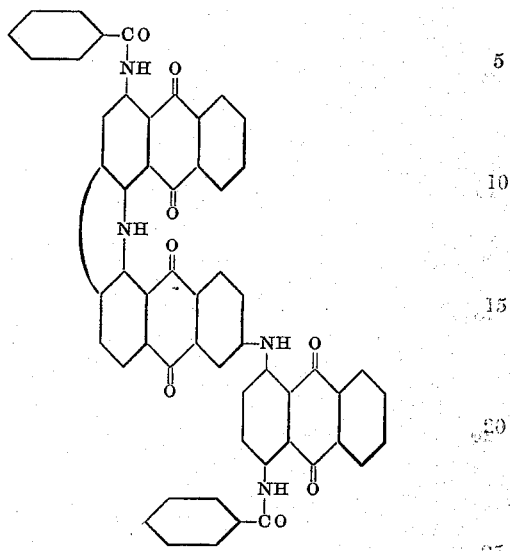

which dissolves in concentrated sulfuric acid with a red brown color and dyes cotton from an alkaline hydrosulfite vat in violet brown shades.

RALPH N. LULEK.
WILLIAM DETTWYLER.